3 Sheets—Sheet 1.
W. W. HUBBARD.
Assignor by mesne assignment to G. D., J. W., L. L., & M. Haworth.
CORN-PLANTER.
No. 7,577. Reissued March 27, 1877.
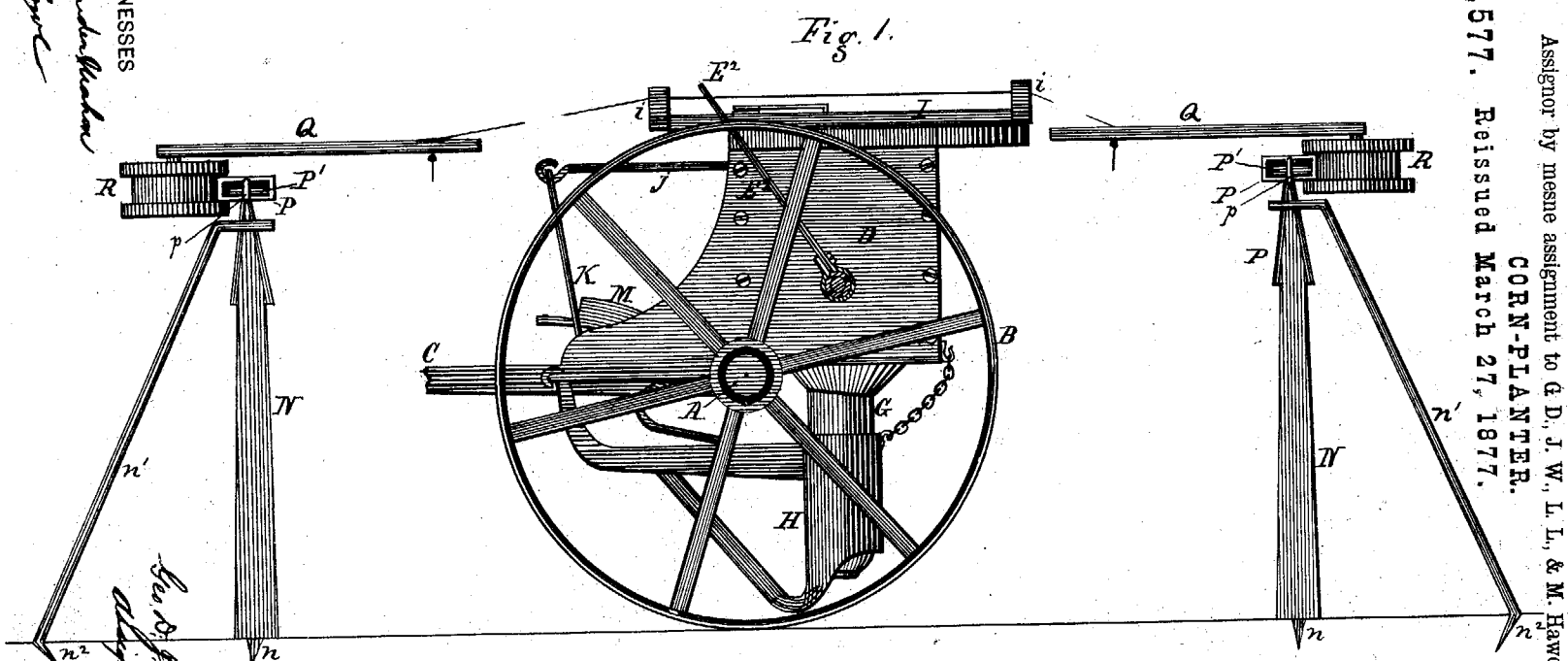
WITNESSES
Alexander Graham
D P Lowe
Geo. D., J. W., L. L. & M. Haworth,
Assignees of W. W. Hubbard,
by A. M. Smith
Attorney.
N. PETERS, PHOTO-LITHOGRAPHER, WASHINGTON, D. C.

3 Sheets—Sheet 2.
W. W. HUBBARD.
Assignor by mesne assignment to G D., J. W., L. L., & M. Haworth.
CORN-PLANTER.
No. 7,577. Reissued March 27, 1877.
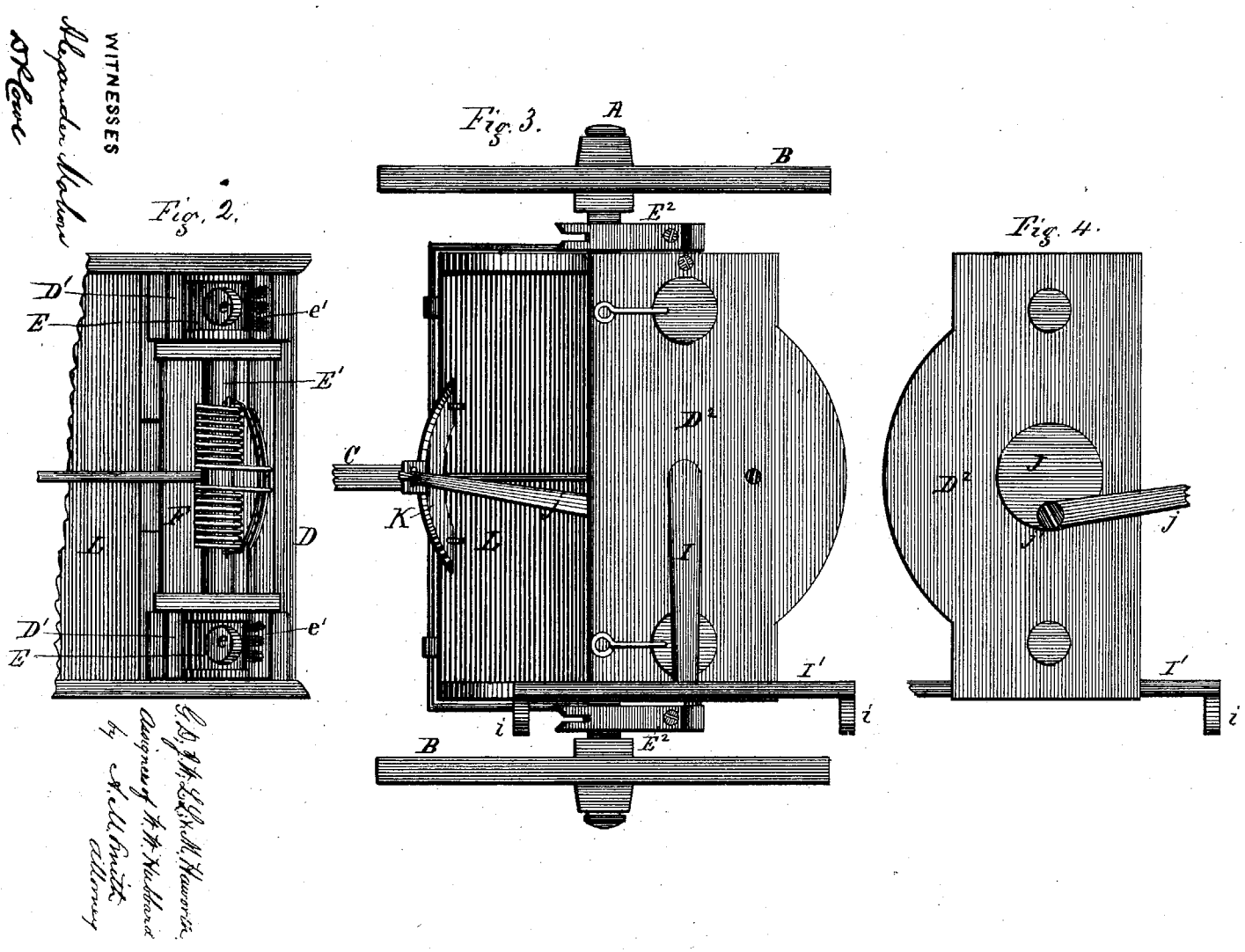
WITNESSES
Alexander Mahon
D R Cook
G. D., J. W., L. L. & M. Haworth
Assignees of W. W. Hubbard
by A. M. Smith
Attorney
N. PETERS, PHOTO-LITHOGRAPHER, WASHINGTON, D. C.

W. W. HUBBARD.

Assignor by mesne assignment to G. D., J. W., L. L., & M. Haworth.

CORN-PLANTER.

No. 7,577. Reissued March 27, 1877.

WITNESSES

Alexander Mal...

D. P. Lowe

Geo. D., J. W., L. L. & M. Haworth
assignees of W. W. Hubbard,
by A. Bell Smith
atty.

N. PETERS, PHOTO-LITHOGRAPHER, WASHINGTON, D. C.

UNITED STATES PATENT OFFICE.

WILLIAM W. HUBBARD, OF EDINBURG, INDIANA, ASSIGNOR, BY MESNE ASSIGNMENTS, TO GEORGE D. HAWORTH, JAMES W. HAWORTH, LYSANDER L. HAWORTH, AND MAHLON HAWORTH, OF DECATUR, ILLINOIS.

IMPROVEMENT IN CORN-PLANTERS.

Specification forming part of Letters Patent No. 54,166, dated April 24, 1866; reissue No. 7,577, dated March 27, 1877; application filed March 6, 1877.

*To all whom it may concern:*

Be it known that WILLIAM W. HUBBARD, of Edinburg, county of Johnson, State of Indiana, did invent certain new and useful Improvements in Corn-Planters, of which the following is a full, clear, and exact description, reference being had to the accompanying drawings, making part of this specification, in which—

Figure 5:
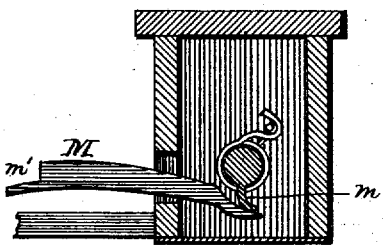
Figure 6:
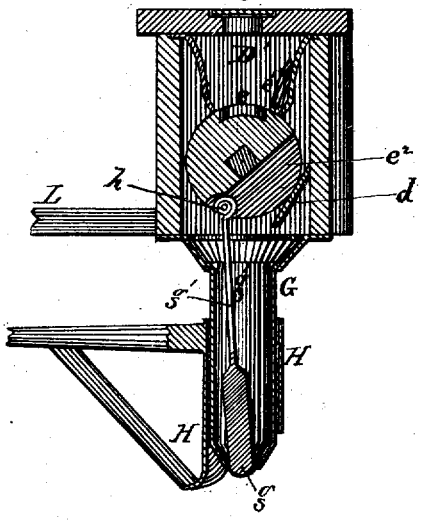

Figure 1 represents a side elevation of the machine, and also side or end views of the anchors or supports to which the ends of the check-row cord or wire are connected. Fig. 2 is a plan view of the seed-box, with the cover removed. Fig. 3 is a plan view of the machine, with the cover applied, and showing the arm or lever which transfers the check-row cord or wire from one side of the machine to the other. Fig. 4 is a bottom view of the cover to the seed-box, showing the disk and a section of the link connecting the lever which transfers the check-row cord or wire with the locking devices, and Figs. 5 and 6 are vertical sections, showing details of construction hereinafter described.

Similar letters of reference denote corresponding parts wherever used.

In seeding-machines employing a check-row cord or wire, as heretofore constructed, it has been necessary to detach or remove the cord or wire from the machine at the ends of the row or rows planted, and to transfer it by hand to the opposite side of the machine after the latter had been turned into position to move in the opposite direction. As heretofore employed, also, the check-row cord or wire has been attached to fixed points or anchors at the sides or ends of the field, and in addition to the transferring of the cord or wire, as explained, it has been requisite also at the ends of the rows to take up and transfer by hand the arm or anchor to which the cord or wire was attached, to adapt it to the changed position of the machine, this arrangement necessitating the employment of men at both ends of the cord or wire to take up and reset the anchors. One of the principal objects of the invention herein described is to overcome these difficulties, and to this end the invention consists in the combination, with the machine, of an arm or guide adapting the machine to be turned at the ends of the rows without necessitating the removal of the check-row cord or wire, and to an arrangement of said guide or arm in such relation to the arms or levers actuating the seeding devices that the knob or projection on the check-row cord or wire, which last acted upon the seeding devices when the machine was moving in one direction shall be the first to act on said seeding devices when the machine is turned to move in the opposite direction, thus terminating the rows all at the same transverse line, or planting out to the ends of the rows in both directions, and this without attention on the part of the driver. It further consists in the employment of traveling-anchors at the ends of the check-row cord, adapting the ends of the cord, when the machine approaches the end of its movement, or of the rows being planted, to move automatically into line with the path of the approaching machine, thus enabling the machine to plant out to the end of the row or rows, as hereinafter explained.

The invention further relates to certain details of construction and arrangement hereinafter fully described.

In the accompanying drawings, A represents the axle; B B, the carrying-wheels, and C the tongue or draft-frame, rigidly secured to, and forming, in connection with the axle, the frame on which the box D is secured. This box, at its ends, has separate compartments $D^1$ $D^1$, forming the grain boxes or hoppers, located at a distance apart conforming to the distance between the two rows to be planted.

Within the grain boxes or hoppers, and forming the bottoms thereto, are located short feed-cylinders E, one in each box, and secured to and moving with a transverse rock-shaft, $E^1$, mounted in suitable bearings in the sides of the boxes $D^1$.

The ends of shaft $E^1$ extend beyond the sides of box D, and have the forked arms or levers $E^2$ rigidly connected with them, one at each end, said arms being operated upon alternately by the check-row cord or wire as the machine is moved in opposite directions, and serving to impart a rocking movement in one direction to the shaft $E^1$ and cylinder E, the movement in the reverse direction for retracting the cylinders to their former position being effected by a spring, F, located between the hoppers $D^1$ $D^1$, and surrounding the shaft, as shown.

The cylinders E have each a pocket, *e*, formed in its upper face, designed to hold the quantity of seed required for a single hill, and which, in the partial rotation of the cylinder by the check-row cord or wire referred to, is carried past a brush, $e^1$, and sufficiently far to cause it to discharge its contents in rear of the cylinder, and between said cylinder and an inclined plate, *d*, (see Fig. 6,) the brush $e^1$ serving to remove all surplus grain from the pocket in the passage of the latter under the same. The seed thus deposited on the plate *d* is held thereon by the cylinder until the latter is retracted, and a groove at $e^2$ therein is brought opposite to said plate, permitting the grain to escape and drop into the conductor-tubes G, connecting the bottoms of the hoppers with the tubular hoes H.

The tubes G are adjustably connected with the hopper bottoms, and are made funnel-shaped at their lower ends, adapting them to receive and be closed by vertically-moving rods or pistons *g*, which are connected by rods *g'* each with an eccentric pin at *h*, applied to the cylinder E in the groove $e^2$, as shown in Fig. 6. By this arrangement, when the cylinders E are rocked backward to empty the pockets *e*, the rods *g* are lifted out of the open lower ends of the spouts or tubes G, permitting the grain therein to escape to the ground, when the return movement of the cylinder allows the rods *g* to descend and close the discharge end of the tubes G in time to receive and retain the grain escaping from the plate *d*, until the operation of the rock-shaft and cylinders E is repeated, as before.

The hoes or teeth H, for opening the furrows to receive the grain, may be of any usual or preferred construction, and they may be connected by hinged adjustable drag-bars with the frame in any usual or preferred manner.

I is an arm, secured by a vertical pivot at its inner end at a point midway of the width of the machine, with the cover $D^2$ of box D in such manner as to be free to turn horizontally from side to side of the machine. The outer end of this arm has a cross arm or bar, I', provided at its ends, in front and rear, with guiding-eyes *i*, arranged in line with one or the other, alternately, of the forked arms $E^2$, the check-row cord or wire passing through said eyes, and being properly guided thereby for acting on said forked arms or levers. The lower end of the vertical pivot, on which the arm I turns, has a disk, J, secured rigidly to it, and a link, *j*, attached to an eccentric pin at *j'* on said plate, extends forward, and is connected at its forward end to an arm or standard, K, pivoted at its lower end to the driver's foot-board L.

M is a foot-lever, pivoted in the forward upright or side of box D, its rear end extending under the shaft $E^1$ at a point about midway of its length, where said shaft is provided with an arm or eccentric, *m*, which rests in contact with the rear end of lever M, as shown in Fig. 5.

The driver, by pressing down on the forward end of lever M, causes said lever to press against the arm *m* and, through said arm, to give a slight forward rocking movement to the shaft E, and thereby to rock the forked arms $E^2$ forward, depressing their upper ends until they escape from the cord or wire and descend below the plate and out of the way of the guiding-eyes *i i*, leaving the arm I free to turn relatively to the path of the machine, as hereinafter explained. The forward end of lever M has a rabbet or shoulder, $m^1$, against which the forked standard K rests when the arm I with its guides *i i* is in position to guide the cord or wire to either of the forked arms or levers $E^2$, but which, when the lever M is depressed, as explained, releases the standard K and leaves the arm I free to swing relatively to the machine from one side to the other, as the machine is turned, the standard K vibrating to accommodate this movement.

By this arrangement of the swinging arm I with its guides and stops, it will be seen that when the machine is to be turned at the end of the field, the driver, by simply pressing down on the lever M, depresses the arms $E^2$ out of the way of the check-row cord or wire and of the arm I and its guides, and, at the same time, releases the standard K and arm I, and, the latter being held stationary by the check-row cord or wire as the machine is is turned, the machine is gradually swung around until it faces in the opposite direction, bringing the arm I with the guides *i* and the check-row cord or wire upon the opposite side of the machine, when the driver releases the lever M, thereby locking arm I in position, and allowing the forked arm or lever $E^2$ opposite to that acted upon when the machine was moving in the opposite direction to be thrown up into position to engage with, and be acted upon by, the cord or wire in the return movement of the machine. This operation is repeated at each end of the field, the arm swinging back and forth, held each time by the cord or wire as the machine is turned, and bringing the arm $E^2$ on one side into exact position to be first acted upon by the knot or projection on the cord or wire, which last acted on the arm $E^2$ on the reverse side, thus giving to the rows a terminal point at the same knot in the cord or wire, or at the same transverse line in both directions.

Instead of the usual fixed points or anchors at the ends of the rows for the check-row cord or wire, uprights N are employed, having points *n*, adapting them to be readily inserted in the ground, and these uprights are further supported by bracing-rods $n^1$, the lower bent or hooked ends $n^2$ of which are also firmly set in the ground, as shown in Fig. 1.

These posts have socket-plates P firmly secured to their upper ends, made in the form of a rectangular box or sleeve, and in the open ends of these sleeves the ends of horizontal bars P′, of any desired length, are secured, little angular hooks at *p*, attached to the sleeves P, entering holes in the bar P′, when in place, and serving to prevent their accidental withdrawal or displacement.

Any desired number of these posts and horizontal bars may be employed, the latter forming a sort of head line or bar, to which the ends of the check-row cord are attached, as follows: Q is a horizontal bar crossing the head-bar P′, referred to, and provided at its outer end with a pendent stud or axle, on which is mounted a grooved pulley, R, which rests against and moves in contact with the horizontal head-bar P′. The inner end of the bar Q has a series of oblique slits or notches, in any one of which the end of the cord or wire may be placed, and a knot or projection thereon prevents it from being withdrawn by the endwise draft or tension. By this arrangement, when the machine approaches the end of its movement in one direction the pulley is allowed to roll on the horizontal head-bar until it reaches and has carried the end of the cord or wire with it into line with the path of the approaching machine, thus adapting the latter to plant out to the end of the row. The necessity for detaching the cord or wire, or of taking up and transferring the anchors by hand at the ends of the rows is thus obviated, all that is necessary after the pulley has passed from one bar, P′, to another, being to take the bar thus released and place it with its supports in front of the advancing pulley R, with one end in the sleeve P, when it is again in readiness to receive and support the pulley in its passage over it. The driver is thus enabled to adjust the bars at the end of the rows, as occasion may require, without other assistance, and when the bars are set it will be seen that the operation of transferring the cord or wire from one point to another on the bar will be effected automatically in the movements of the machine.

Having thus described the invention, what is claimed as new, and sought to be secured by Letters Patent, is—

1. In a seed-planter, in which the seeding devices are operated by a check-row cord or wire, an arm or guide for transferring said cord or wire from one side of the machine to the other without removing the cord or wire from the arm or guide.

2. The combination, with a check-row seed-planter, of a swinging arm or guide for the check-row cord or wire, adapting the latter to be automatically transferred from one side of the machine to the other when the machine is turned.

3. The combination of the check-row cord or wire for operating the seeding devices, with traveling arms or anchors adapting said cord or wire to be moved automatically by the machine into position, thereby enabling the machine to approach to and reach the end of the row without the transfer of the anchor by hand.

4. The combination, with the horizontal bars P′, of the arms or anchors, to which the ends of the check-row cord or wire are attached, substantially as and for the purpose described.

5. The combination of the arm or guide for transferring the check-row cord or wire with the arms or levers for actuating the seeding devices, whereby the machine is adapted to plant out to the same terminal point or line when moving in opposite directions.

6. The combination of the upper and lower seed-drops, with the arms or levers actuated by the check-row cord or wire, whereby a positive movement in one direction is simultaneously imparted to said drops by the action of the check-row cord or wire on said arms or levers.

7. The combination, with the swinging arm, which supports and guides the check-row cord or wire, of stops for locking said arm in the desired position, to act on the seeding devices.

8. The forked arms or levers, actuating the seeding devices, in combination with an arm or lever for moving said forked arms out of the path of the check-row cord or wire and its supporting-arm, when the machine is being turned.

In testimony whereof we have hereunto set our hands this 23d day of February, A. D. 1877.

GEORGE D. HAWORTH.
JAMES W. HAWORTH.
LYSANDER L. HAWORTH.
MAHLON HAWORTH.

Witnesses:
W. W. KERR,
F. P. LEWIS.